(12) United States Patent
Hitz (10) Patent No.: US 12,109,689 B2
(45) Date of Patent: Oct. 8, 2024

(54) MONITORING SYSTEM FOR A FLEXURALLY ELASTIC STRAND-SHAPED ELEMENT AND FLEXURALLY ELASTIC, STRAND-SHAPED ELEMENT

(71) Applicant: Bizlink Robotic Solutions Germany GmbH, Schmalkalden (DE)

(72) Inventor: Bastian Hitz, Postbauer-Heng (DE)

(73) Assignee: BizLink Robotic Solutions Germany GmbH, Schmalkalden (DE)

( * ) Notice: Subject to any disclaimer, the term of this patent is extended or adjusted under 35 U.S.C. 154(b) by 334 days.

(21) Appl. No.: 17/600,704

(22) PCT Filed: Mar. 26, 2020

(86) PCT No.: PCT/EP2020/058622
§ 371 (c)(1),
(2) Date: Oct. 1, 2021

(87) PCT Pub. No.: WO2020/201031
PCT Pub. Date: Oct. 8, 2020

(65) Prior Publication Data
US 2022/0184822 A1 Jun. 16, 2022

(30) Foreign Application Priority Data
Apr. 1, 2019 (DE) .................. 10 2019 204 618.5

(51) Int. Cl.
*B25J 19/00* (2006.01)
*B25J 9/16* (2006.01)
*F16L 11/12* (2006.01)
*G01L 5/22* (2006.01)
*H02G 1/00* (2006.01)

(52) U.S. Cl.
CPC .......... *B25J 19/0025* (2013.01); *B25J 9/1674* (2013.01); *F16L 11/12* (2013.01); *G01L 5/226* (2013.01); *H02G 1/00* (2013.01)

(58) Field of Classification Search
CPC ...... B25J 19/0025; B25J 9/1674; F16L 11/12; G01L 5/226; H02G 1/00
See application file for complete search history.

(56) References Cited

U.S. PATENT DOCUMENTS

| 8,953,915 B2 | 2/2015 | Sarchi et al. |
| 9,999,477 B2 | 6/2018 | Takahashi et al. |
| 10,175,124 B2 | 1/2019 | Hermey et al. |
| 11,041,899 B2 | 6/2021 | Janssen et al. |

(Continued)

FOREIGN PATENT DOCUMENTS

| CN | 101548344 A | 9/2009 |
| CN | 102460606 A | 5/2012 |

(Continued)

*Primary Examiner* — Peter J Macchiarolo
*Assistant Examiner* — John M Royston
(74) *Attorney, Agent, or Firm* — Laurence A. Greenberg; Werner H. Stemer; Ralph E. Locher (57) ABSTRACT

A monitoring system is used to monitor the bending load of at least one strand-shaped element. The strand-shaped element is subjected to bending during operation, extends in a longitudinal direction. The element has a sheath, in which a recess is formed on the circumferential side, at least in sections. A pressure-sensitive sensor element lies in the recess and emits a sensor signal in the event of a pressure load.

17 Claims, 3 Drawing Sheets

(56) References Cited

U.S. PATENT DOCUMENTS

| | | |
|---|---|---|
| 2007/0156019 A1 | 7/2007 | Larkin et al. |
| 2010/0277329 A1 | 11/2010 | Worzyk |
| 2014/0033851 A1 | 2/2014 | Hermey et al. |
| 2017/0350733 A1 | 12/2017 | Salomonsson |
| 2019/0326740 A1 * | 10/2019 | Hermey .................. F16G 13/16 |
| 2020/0259319 A1 | 8/2020 | Joesten |

FOREIGN PATENT DOCUMENTS

| | | | | |
|---|---|---|---|---|
| CN | 103460606 | A | 12/2013 | |
| CN | 104395640 | A | 3/2015 | |
| CN | 104697432 | A | 6/2015 | |
| CN | 204575596 | U | 8/2015 | |
| CN | 105407781 | A | 3/2016 | |
| CN | 206672662 | U | 11/2017 | |
| CN | 108340410 | A | 7/2018 | |
| CN | 208458794 | U | 2/2019 | |
| DE | 102004018213 | A1 * | 11/2005 | .......... B25J 19/0025 |
| DE | 102006056235 | A1 | 6/2008 | |
| DE | 202012101535 | U1 | 7/2013 | |
| DE | 102016203552 | A1 | 9/2017 | |
| DE | 102017209509 | A1 | 12/2018 | |
| JP | 2004136371 | A | 5/2004 | |
| WO | 2010025159 | A1 | 3/2010 | |
| WO | 2011042023 | A1 | 4/2011 | |
| WO | WO-2015144575 | A1 * | 10/2015 | ............. E21B 17/20 |
| WO | 2018086949 | A1 | 5/2018 | |

\* cited by examiner

MONITORING SYSTEM FOR A FLEXURALLY ELASTIC STRAND-SHAPED ELEMENT AND FLEXURALLY ELASTIC, STRAND-SHAPED ELEMENT

FIELD AND BACKGROUND OF THE INVENTION

The invention relates to a monitoring system for monitoring the bending load of at least one strand-shaped element subjected to bending during operation.

Such a flexurally stressed strand-shaped element is, for example, a supply package, with which two machine parts that are movable relative to one another are connected. In this context, "supply package" is generally understood to mean a guide element with individual supply lines lying therein, for example electrical, hydraulic and also pneumatic individual lines. The guide element is, for example, a hose-like element, which has an inner cavity, in which the individual supply lines are guided, in particular loosely.

Such a supply package is also called a hose package and is used, for example, in multi-axis industrial robots. Such a hose package is typically guided along a robot arm in the direction of a robot hand, to which a tool is attached. Typically, one end of the hose package is attached to a length compensation device that has a return mechanism.

Such hose packages in industrial robots are subjected to very high flexural fatigue stresses. Accordingly, the service life of the hose packages is limited, so they have to be replaced regularly.

It is desirable to be able to make a good estimate of the service life of such a hose package or also to be able to detect improper operation or improper handling of the hose package in use.

SUMMARY OF THE INVENTION

Based on this, the invention is based on the task of obtaining information on bending stresses of a strand-shaped element, in particular of such a hose package.

The task is solved according to the invention by a monitoring system, which is designed to monitor the bending load of at least one strand-shaped element subjected to bending during operation. Said strand-shaped element is typically arranged and fastened during operation to a unit to be monitored, for example an industrial robot. The monitoring system thereby comprises:

The strand-shaped element, which extends in a longitudinal direction and has a sheath, in which at least one recess is formed circumferentially at least in sections,
a pressure-sensitive sensor element, which lies in the recess and which is designed to emit a sensor signal in the event of a pressure load,
a local measuring unit for receiving the sensor signal,
furthermore, an evaluation unit for evaluating the sensor signal with regard to a bending stress of the strand-shaped element on the basis of a pressure load of the sensor element caused by a bending is provided and is part of the monitoring system.

In a first embodiment, the evaluation unit is directly part of the unit to be monitored. For example, together with the local measuring unit it forms a common local unit, which is arranged on the device. Alternatively, the evaluation unit is arranged at a distance from the device to be monitored and is only connected or at least connectable to the measuring unit in terms of data exchange in order to be able to receive the sensor signal. In this context, the data connection is in particular wireless, for example also via the internet. "Arranged remotely from the unit to be mo-nitored" it is understood to mean in particular that the evaluation unit is not arranged in the immediate vicinity of the unit and preferably also not arranged in the building or in the operating site where the unit to be monitored is arranged.

Of particular importance is the arrangement of the pressure-sensitive sensor element in the peripheral recess. The sensor element is inserted precisely in the recess, so that it is subjected to a pressure load due to compression of the sheath when the strand-shaped element and thus also the sheath are bent. Since—depending on the direction of the bending of the element—the recess is compressed, a pressure load is exerted on the sensor element during bending, which is sensitive to this pressure load.

"Circumferential recess" is generally understood to mean a recess in a wall of the sheath. This can be either a recess on the outer circumference or a recess on the inner circumference of the sheath.

This measure enables a simple detection of a bending load of the strand-shaped element, so that statements can be made, for example, about inadmissible loads or also a remaining service life on the basis of the sensor signal and a suitable evaluation.

In an appropriate embodiment, the recess is a helical groove at least in sections. The helical groove therefore runs at least in sections around the circumference of the sheath. The groove is thereby inserted in the sheath material. Expediently, the groove runs over the entire length or at least over almost the entire length of the sheath (for example over at least 90% of the total length). Further preferably, the groove is helical throughout.

Furthermore, the sensor element is designed as a sensor line, which lies in the groove and preferably runs in the groove over its entire length or at least over a wide area (e.g. more than 50%) of the groove.

The sensor line has a conductor, which is surrounded by a dielectric. The sensor line is connected to the measuring unit, i.e. in particular connected to it. Preferably, in addition to receiving the sensor signal, the measuring unit is also designed to feed a measuring signal into the sensor line and feeds in the measuring signal for measuring. The received sensor signal is formed by a reflected signal portion of the measurement signal. This reflected signal portion is generated by the mea-surement signal being reflected at an interference point. The interference point is formed at a point, at which the dielectric is subjected to a pressure load as a result of bending of the strand-shaped element and is compressed in particular.

The measurement signal is in particular a high-frequency signal with a frequency of typically several 10 or also several 100 MHz. Preferably, the frequency is varied over a predetermined frequency range during operation. In particular, a cyclic va-riation between two frequency values is provided (so-called "wobbling"). Alternatively, the measurement signal is a step signal or a measurement pulse, as described for example in WO 2018/086949 A1.

The sensor line generally has an impedance, which is largely determined by the dielectric. Deformation of the dielectric as a result of pressure stress generally leads to a local change in impedance occurring at the pressure point. At this pressure-stressed point, hereinafter also generally referred to as the interference point, the measurement signal propagating in the sensor line is at least partially reflected. The reflected portion then runs back in the direction of the measuring unit where the reflected portion is detected.

The sensor line insofar is a transverse pressure sensitive element in that a pressure exerted perpendicular to a direction of propagation of the sensor line is detected.

The particular advantage of this measure is to be seen in the fact that a simple monitoring of the bending stresses of the strand-shaped element is made possible by simply inserting the sensor line into the helical groove. When the strand-shaped element is bent, a pressure load is exerted on the sensor cable by lateral groove walls, which delimit the groove narrowing the receiving space of the groove and thus compressing the sensor element designed as a sensor cable, which lies therein.

The sheath is preferably a so-called corrugated hose. Preferably, at least one sup-ply line is routed in it. Alternatively, a medium is guided in the hose. In such a corrugated hose, the helical groove preferably extends continuously from one end to the other end of the sheath.

The sheath is preferably a guide or protective element, in which the at least one supply line is guided. Said supply line is, for example, an electrical, pneumatic or hydraulic line. Typically, a plurality of supply lines are guided within the corrugated hose, wherein different types of supply lines can also be guided.

In a particularly preferred embodiment, the strand-shaped element is a so-called hose package of a multi-axis industrial robot. The hose package is therefore designed for installation on such an industrial robot. Expediently, it is attached to such a robot. During operation, the hose package serves to supply a tool, which is arranged on a robot hand. It extends along a robot arm, preferably up to a device for length compensation. In this device, length changes due to the movement of the robot hand or other robot arms are compensated. The individual supply lines are typically routed out of the corrugated hose to an interface where they are connected or can be connected, for example via detachable coupling points, to corresponding further supply lines.

The sensor line preferably extends along the entire length of the sheath and groove, at least along a major portion of the length of the sheath or respectively the groove.

The sensor line generally has an outer diameter and the groove has a groove width, the outer diameter being matched to the groove width. This is understood to mean that the groove width and the outer diameter are exactly or at least largely identical. "At least largely identical" is understood to mean that the groove width and the outer diameter match up to a tolerance range of at most +/−15% and further preferably of at most +/−10% or of at most +/−5%. "Groove width" is understood to mean the clear distance between two opposing groove walls in an unloaded state, i.e. in particular when the sheath is not bent.

Expediently, the outer diameter has a slight oversize of, for example, a maximum of 5% or even a maximum of 10% compared to the groove width. This ensures, for example, that the sensor cable is held in the groove purely by friction. Preferably, no further fastening elements are used.

In an appropriate embodiment, the dielectric is elastically deformable and is designed in particular as a foamed dielectric. A thermoplastic rubber is particularly suitable as the material for this, since it has a high restoring force. Additionally, a polyurethane (PUR) or a thermoplastic elastomer, in particular a crosslinked thermoplastic elastomer, such as a TPV (thermoplastic polyolefin vulcanizate) is preferably used as the material for the dielectric.

These materials generally have good elasticity and thus good restoring force. This is crucial in order to be able to record the often frequent alternating bending stresses in real time without disruptive, excessive relaxation times hindering the measurement.

The material preferably has a density of the plastic material used in the range 0.9 to 1.0 g/cm$^3$, especially in the range 0.9 to 0.95 g/cm$^3$. These values apply to an unfoamed state. In a preferred embodiment, a foamed plastic is used. On the one hand, the density is suitably adjusted by foaming and, on the other hand, this also adjusts the sensitivity, since the (transverse) force required for compression decreases with increasing foaming.

The sensor line is designed, for example, as a single core or a pair of cores. A core is a metallic conductor surrounded by a core sheath as insulation. The core sheath forms the dielectric.

Preferably, the sensor line is designed as a coaxial line. As such, the sensor line has an inner conductor as a conductor, which is directly surrounded by the dielectric. An outer conductor is again directly attached around the dielectric. This is often a shielding of the dielectric, for example in the form of a braided shield.

The evaluation of the reflected portion of the measurement signal is generally based—as explained above—on the fact that the impedance value changes at this local position when a local pressure stress is applied, so that the interference point is formed at this local position, at which a signal portion is reflected.

The evaluation of such reflected signal portions can be carried out, for example, by means of so-called time measurement methods (time domain reflectometry, TDR). In this context, the propagation time of the signal is generally determined. Based on the (measured) propagation time and a known propagation speed, the location of the interference point can be determined. If the geometric course of the sensor line and the groove is known, the location of the interference point on the sheath and thus also the direction of the bending can be inferred. Preferably, a simplified time measurement method is used, as described for example in WO 2018/086949 A1.

Alternatively, there is also the possibility of an evaluation in frequency space. So-called frequency reflectometry methods (FDR Frequency Domain Reflectometry) are known for this purpose. Preferably, such an FDR method is used. The measuring unit is designed to feed in a so-called wobble signal in order to be able to carry out such an FDR method. The reflected signal portions are evaluated in the evaluation unit. The reflected signal portions, also referred to as the reflected signal for short, are thus transmitted to the evaluation unit, where the evaluation of the reflected signal takes place. The term "wobble signal" is generally understood to mean a signal with typically constant amplitude, the frequency of which is varied between an upper and lower limit frequency. Within this frequency band between the upper and lower cut-off frequency lies a line-specific main frequency, which also depends, among other things, on the length of the sensor line. Usually, the measurement signal is fed in at one end of the sensor line and reflected at an opposite end of the sensor line, for example a short-circuited end or also an open end, and runs back to the measurement unit where it is received. Such a line-specific frequency satisfies in particular the following simplified formula:

$$f_{[MHz]} = 150 * vr/d_{[m]}$$

wherein f=frequency in MHz, d=length of the signal path in meters, vr=the relative propagation speed of the measurement signal.

The relative propagation speed is typically 0.66 to 0.8. It is defined as the ratio of the propagation speed to the speed of light (in vacuum).

The frequency is generally proportional to the reciprocal of the square root of the dielectric constant Er. The length of the signal path typically corresponds to twice the length of the sensor line (outward and return path from a feed point to a line end where the signal is reflected and runs back to the feed point=measuring unit).

In an appropriate embodiment, the evaluation unit is designed to identify the location of the bending on the basis of the sensor signal. This is therefore a spatially resolved measurement. In the case of a direct measurement of the transit time, for example via a TDR measurement, this results directly from the transit time with a known propagation speed and with known geometric factors. The geometrically known factors here include the diameter of the cladding at a groove base and the pitch of the helical groove. These geometric factors can be used to determine a location along the cladding where the interference point exists where the reflected signal portion was reflected.

In case of a measurement in frequency space, for example, the measured frequency spectrum is converted into a time-dependent curve by an inverse Fourier transformation. This time curve can then be used to determine the propagation time. Furthermore, it is possible to determine the positions of the interference points along the length of the sensor line by determining the phase position of the reflected signal. For this purpose, a so-called vector network analyzer (VNA) is used in a manner known per se.

The evaluation unit is preferably further designed to determine the direction of the bending of the sheath on the basis of the sensor signal. This is preferably done by determining the position of the interference point in the course of the sensor line as accurately as possible. Based on the known geometric data, it is then possible to determine at which angular position the interference point is present, i.e. whe-ther this point is present, for example, at an upper side, at a lateral position or at a lower side of the sheath. The direction of the bending can then be determined on the basis of this angular position.

In an appropriate further development, the evaluation unit also uses the sensor signal to infer a current bending radius.

Different bending radii generally lead to different compression. This influences the proportion of the reflected signal. On the basis of the level of the reflected signal portion, the degree of bending can therefore be concluded.

According to a first embodiment, for example, the bending radius is determined by comparing the curves of the reflected signals with previously measured reference curves, in particular reference spectra, which are assigned to specific bending radii. Reference curves or respectively reference spectra are therefore respectively stored for different bending radii.

Additionally or alternatively, the sensor signal is used to determine how many interference points are present, with the current bending radius being inferred from the number of interference points. This is based on the consideration that the number of interference points varies depending on the bending radius, i.e. with a small bending radius, more winding sections are compressed in such a way that they act as interference points compared to a large bending radius. There is therefore a correlation between the current bending radius and the number of interference points.

Additionally to or supplementary to the number of interference points, the bending radius is also concluded, for example, on the basis of the amplitude ratios or also the absolute amplitudes of the sensor signal for the individual interference points (in each case a maximum in the signal curve). In the case of a bending, the highest compression occurs in the middle of the bending, which leads to a maximum with the highest amplitude in the sensor signal.

Preferably, a frequency spectrum recorded during the measurement is observed and evaluated. Such a spectrum is obtained, for example, in an FDR (frequency reflectometry) method, in which a so-called wobble signal is fed in as the measurement signal. Specifically, the amplitude ratio between main maxima and secondary maxima and the number of maxima in the spectrum are used to infer the degree of bending/bending radius.

In a preferred embodiment, the evaluation unit is designed as a central unit that is arranged at a distance from the flexurally elastic element to be monitored and in particular, optionally also from any unit to be monitored, to which the flexurally elastic element is attached, especially an industrial robot. The local measuring unit is designed for transmitting and the central unit for receiving the sensor signal. The transmission of the sensor signal is preferably wireless, but can in principle also be cabled. In the case of the wireless connection, the transmission takes place via the Internet, for example, and specifically this is a cloud-based evaluation. This means that the data of the sensor signals are transmitted to a cloud memory, i.e. a central storage location connected via the Internet, and are read out from there for evaluation by the evaluation unit.

In this context, "remote" is also understood to mean, in particular, that the evaluation unit is not located in the same operating location as the strand-shaped element to be monitored. Preferably, the central unit is located at the manufacturer's premises or at the premises of another service provider that is independent of the operator of the device.

Expediently, a plurality of strand-shaped elements to be monitored, i.e. in particular a plurality of hose packages to be monitored, are technically connectable or connected to the central unit in terms of data exchange. The central unit is designed to evaluate the data from the plurality of elements to be monitored. The data from a multiplicity of elements to be monitored are therefore received and evaluated via the central unit. This provides a broad data base over a multiplicity of installations and applications. By this measure, the data obtained can form the starting point for data-based models, for example, to simulate the stress, wear resistance or service life of the hose packages used. In this way, more precise statements can then be derived with regard to service life, probability of failure, etc., on the basis of the broad database. Weak points can also be identified at an early stage and then avoided, for example, by design modifications or changes in the process sequence.

According to the invention, the task is further solved by a strand-shaped element, which is elastic in bending and subjected to bending during operation and which is intended in particular for use in a unit to be monitored. The element extends in a longitudinal direction and has a flexurally elastic sheath, in which a recess is inserted circumferentially at least in sections. Furthermore, a pressure-sensitive sensor element is provided, which lies in the recess and which is designed to emit a sensor signal in the event of a pressure load as a result of bending of the strand-shaped element. Furthermore, a local measuring unit is provided for receiving the sensor signal, the measuring unit also being designed to transmit the sensor signal to an evaluation unit.

The advantages and preferred designs listed with regard to the monitoring system can also be applied analogously to the flexurally elastic element. Specifically, this is a hose package for an industrial robot with a corrugated hose as a sheath with a helical groove, in which a sensor line lies as a sensor element.

An example of an embodiment is explained in more detail below with reference to the figures. These respectively show in partially simplified representations:

DETAILED DESCRIPTION OF THE INVENTION

Figure 1:
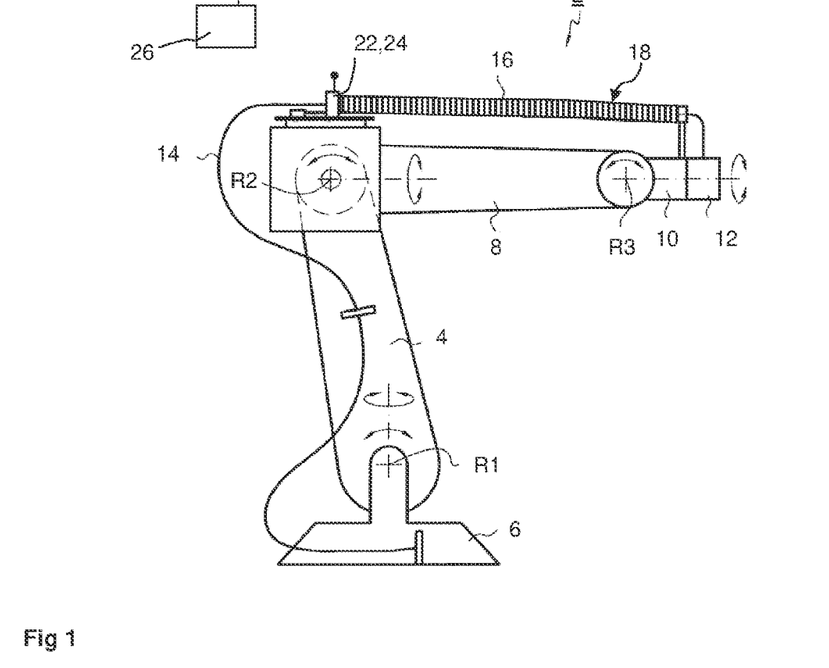
FIG. 1 a simplified illustration of an industrial robot.

FIG. 1 shows an articulated-arm robot that is designed as a multi-axis industrial robot 1, in particular as a six-axis industrial robot 2. This has a first segment, also referred to as rocker 4, which is connected to a base 6 via a first articulated joint R1. The rocker 4 can be pivoted about this about a horizontal axis. Additionally, the rocker 4 can usually be pivoted about a vertical axis. At a second articulated joint R2, a second segment, commonly referred to as a robot arm 8, is connected to the rocker 4 so as to be pivotable about a so-called (horizontal) "axis 3". Finally, as a third segment, a robot hand 10 is connected to the robot arm 8 via a third articulated joint R3. Finally, a processing tool 12, such as welding tongs, etc., or a holder, for example for a medical device, is attached to the robot hand 10.

To supply the processing tool 12 with electricity and/or fluids and/or data signals, the industrial robot 2 has a supply line package 14, which is routed along the robot arm 2 and connected from there to the base 6. In the area of the robot arm 6, the supply line package 14 is guided in a sheath (protective hose) designed as a corrugated hose 16. The supply line package 14 together with the corrugated hose 16 is also referred to as hose package 18. Said hose package 18 is a flexurally elastic element, which is subjected to flexural fatigue stresses during operation. Typically, a separation point for the supply line package 14 is arranged in the area of the second articulated joint R2, and the hose package 18 is guided as a replaceable wear unit up to this separation point.

Furthermore, a device 20 for guiding and retrieving the hose package 18 is attached to the robot arm 6, especially in the area of the second joint R2. Said device 20 serves to compensate for the length during the movements of the robot hand. The hose package 18 is held on the device 20 by a retaining element (hose clamp) 22. Preferably, a measuring unit 24 is integrated on or in the holding element 22.

The measuring unit 24 is further in data connection with an evaluation unit 26, and is designed at least for the transmission of data in the evaluation unit 26.

The measuring unit 24 and the evaluation unit 26 are part of a monitoring system for monitoring the hose package 18, which is flexurally elastic and subjected to bending during operation. The hose package 18 itself is also part of the monitoring system. This will now be explained in more detail in connection with FIGS. 2 and 3.

Figure 2:
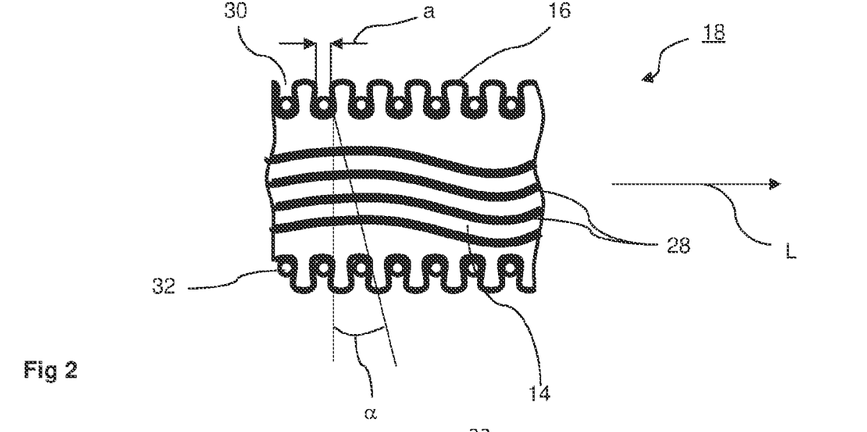
FIG. 2 a simplified, sectional cross-sectional view of a corrugated hose with a helical groove, in which a sensor line lies, FIG. 3 a cross-sectional view of a coaxial line, FIG. 4 an example of a measurement setup FIG. 5A to 5E exemplary signal curve for different numbers of interference points, as well as FIG. 6 a simplified illustration of a plurality of units to be monitored, which transmit the sensor signals to a central unit In the figures, parts with the same effect are given the same reference signs.
Figure 3:
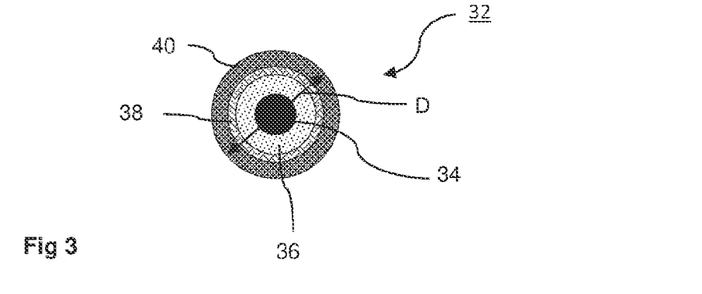

FIG. 2 first shows a sectional cross-sectional view of the hose package 18 with the corrugated hose 16 and the supply line package 14 lying therein. The hose package extends generally in a longitudinal direction L. The supply line package 14 comprises a plurality of supply lines 28, which are loosely guided within the corrugated hose 16, for example.

The corrugated hose 16 has a helical groove 30 on its circumference, i.e. on its outer sheath. In this case, an outer groove (groove 30) open to the surroundings is usually formed on a (radial) outer side of the hose sheath and an inner groove open to the interior of the corrugated hose 16 is formed on a (radial) inner side as a result of a corrugated design of the wall of the hose sheath, viewed in longitudinal cross section. At least in one of these grooves, in the embodiment example in the outer groove 30—as can be seen in FIG. 2—a sensor line 32 is guided. The groove 30 is in each case bounded by opposite groove walls and a groove bottom. The clearance between the groove walls of a groove 30 defines a groove width a and corresponds at least largely to a diameter D of the sensor line 32. The sensor line 32 is therefore inserted precisely in the groove 30.

The groove 30 and thus the sensor line 32 are wound comparatively tightly around the circumference of the corrugated tube 16. Due to the helical configuration of the groove 30, the sensor line is thus helically guided and thus guided along a helix. A pitch angle $\alpha$, which characterizes the pitch of the groove 30, is relatively small. Preferably, the pitch angle $\alpha$ is generally in a range between 5° and 30° and in particular between 10° and 20°. The diameter of the hose package 18 is typically in the range of a few centimeters, for example in the range of 3 to 8 cm.

Figure 4:
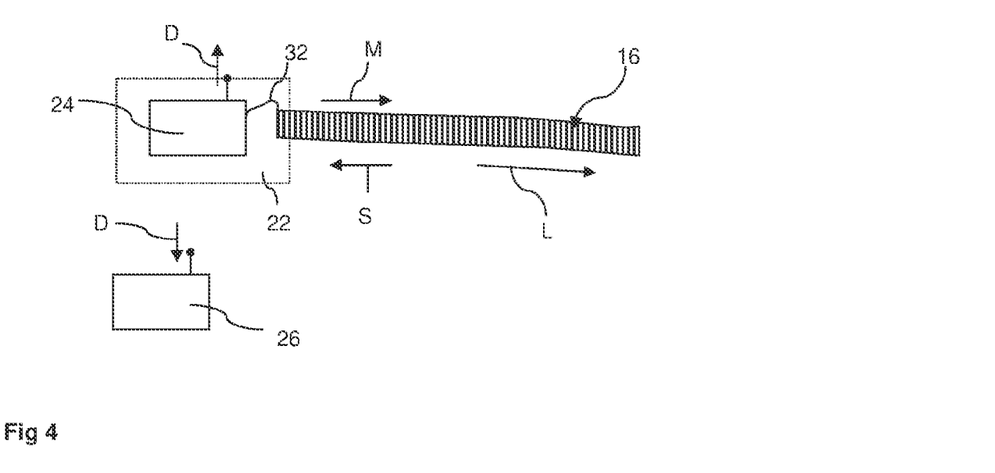

The sensor line 32 is in particular a coaxial line, as exemplarily shown in FIG. 4. As such, it has a central conductor 34, which is directly surrounded by a dielectric 36 made of plastic. Said plastic is an elastic, in particular foamed material. The dielectric 36 is in turn concentrically surrounded by an outer conductor 38, which is formed by a shield, for example a braided shield. This is finally surrounded by a conductor sheath 40.

As can be seen in particular from FIG. 4, the sensor line 32 is connected to the measuring unit 24.

During operation, the measuring unit 24 feeds a measuring signal M into the sensor line 32 at a feed point. Said measuring signal M is, for example, a high-frequency signal, for example a sinusoidal signal. The measuring signal M passes through the sensor line 32. The measuring signal M is completely reflected at the end of the sensor line 32 opposite the feed point, which is designed, for example, as a short-circuited end or as an open end, and runs back again in the direction of the measuring unit 24 as a (reflected) sensor signal S and is detected by the measuring unit 24. In the measuring unit 24, a first evaluation of the sensor signal S can already be carried out. The data D generated in this process are transmitted to the evaluation unit 36 for further evaluation, for example. In principle, it is also possible to transmit the sensor signal S directly to the evaluation unit 26, i.e. the sensor signal forms the data D. Furthermore, it is possible for the evaluation unit 26 to be integrated directly into a common construction unit with the measuring unit 24.

When the hose package 18 is subjected to bending stress, the corrugated hose 16 is compressed overall on an inner side of the bending, so that the groove width a is thus reduced. As a result, at the point of bending, the sensor line 32 lying therein is subjected to a pressure load and, in particular, also compressed. This point of pressure load thereby forms an interference point.

Due to the comparatively tight winding of the sensor line 32, a plurality winding sections of the sensor line 32 are typically compressed at the same time, so that typically a plurality of interference points are generated at the same time during a bending. As a result of the compression of the sensor line 32, and thus also of the dielectric 36, the impedance changes locally at the location of the bending (interference point). This change in impedance or respectively the impedance jump causes the propagating measurement signal M to be at least partially reflected at this point and to run back to the measuring unit 24 where it can be evaluated.

According to a first preferred variant, a frequency reflectometry method (FDR) is used for the evaluation. For this purpose, a so-called wobble signal is fed in as the measurement signal M by means of the measuring unit 24. Said wobble signal is a signal of constant amplitude, whose frequency is varied between an upper and lower cutoff frequency. Within the frequency range determined by these two cut-off frequencies lies a main frequency, which is determined by the propagation speed of the measurement signal M and the signal path (twice the length of the sensor line 32) according to the formula $f_{[MHz]}=150*vr/d_{[m]}$ (see formula above). Gene-rally, the length of the sensor line 32 is in the range between 5 m and 30 m and in particular in the range between 15 and 25 m. Preferably, the length of the sensor line 32 generally exceeds the length of the hose package 18 by a factor of 5 to 15. The length of the hose package 18, in turn, typically lies in the range between 0.5 and 3 m and, in particular, between 1 m and 2 m.

In FIGS. 5A to 5E, different idealized curves of the sensor signal S are shown for a different number of interference points. In the individual figures, the amplitude is plotted against the frequency of the sensor signal S. For example, the wobble signal fed in was varied in the range between 0 and 400 MHz.

A defined frequency of the reflected sensor signal S is assigned to each position of an interference point. According to the above formula, the frequency depends on the distance between the feed point and the interference point at which the signal portion is reflected.

Figure 5A:
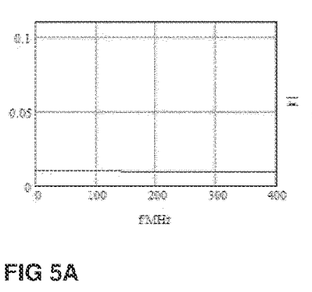
Figure 5B:
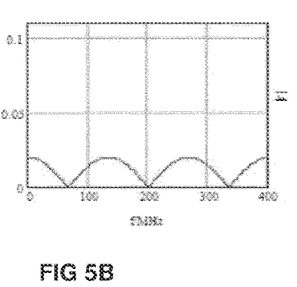
Figure 5C:
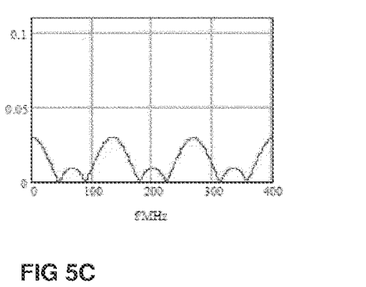
Figure 5D:
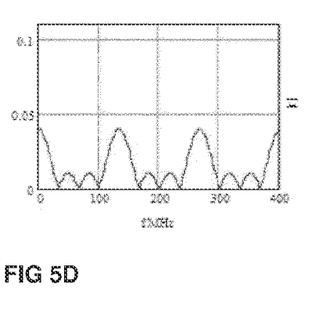
Figure 5E:
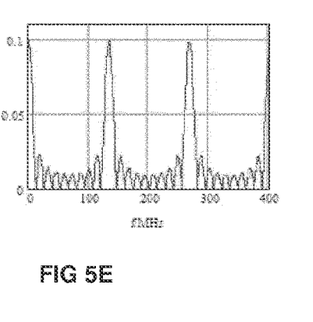

FIG. 5A thereby shows a situation with only one interference point. FIG. 5B shows the situation with two interference points, FIG. 5C the situation with three interference points, FIG. 5D the situation with four interference points and FIG. 5E the situation with ten interference points. Due to the plurality of interference points, there are a plurality of signal portions that are reflected at the interference points respectively. Due to the spatial distance of the interference points, a superposition of the signal portions takes place (due to phase difference, conditioned by distance, an in-phase or antiphase superposition results), so that the shown characteristic spectra with the maxima and secondary maxima result. Due to this superposition of reflections, the sensor signal becomes clearer and more concise with an increasing number of interference points.

In particular, the shape of the sensor signal, i.e. the position of the maxima and minima, the number of secondary maxima per main maxima as well as the signal level at the maxima and minima, is used to determine, for example, the number and extent of the interference points, the distance between the interference points and thus also the degree of bending.

The spectrum obtained during the measurement is usually characterized by the specific frequency correlating to the length of the sensor line. Additionally, the spectrum is also characterized by other specific frequencies, which correlate in particular to other distances. These are, for example, the distances to and from the first interference point or to further interference points or between the interference points. The spectrum is also characterized by multiple reflections between interference points or between interference points and the conductor end.

Generally, by means of the evaluation unit 26, the hose package 18 is checked with regard to a current bending load by means of the received sensor signal S.

This checking is preferably performed continuously during operation, i.e. when the industrial robot 2 is in use. In this context, continuous means in particular that a respective measurement, initiated by the feed-in of the measurement signal M, is performed continuously. For this purpose, the measurement signal is fed in continuously, i.e., for example, the wobble signal is "tuned through" continuously over the different frequencies. Alternatively, the signal is fed in at recurring time intervals, for example in the range of a few seconds. Or in the range of tenths of se-conds. By monitoring continuously in this manner, real-time monitoring is made possible during the movements and bending stresses of the hose package 18.

The detected sensor signal S is used to determine specifically at which locations the bending stress occurs, in which direction the hose package was bent, and finally how large the bending radius is. The evaluations can therefore be used to determine the actual bending stress experienced by the hose package during operation.

Since the hose package 18 is typically used to perform regularly recurring process cycles, it is therefore possible to reproduce to a large extent exactly the course of the bending stress of the hose package during such a process cycle.

This data is then preferably used to derive statements about the actual load, the wear and a possible remaining service life of the hose package 18 and, in particular, also to make recommendations, for example, for replacing the hose package 18. Operating situations that lead to an impermissible bending load can also be detected at an early stage in this way, so that measures can be taken in good time by means of suitable warnings.

Figure 6:
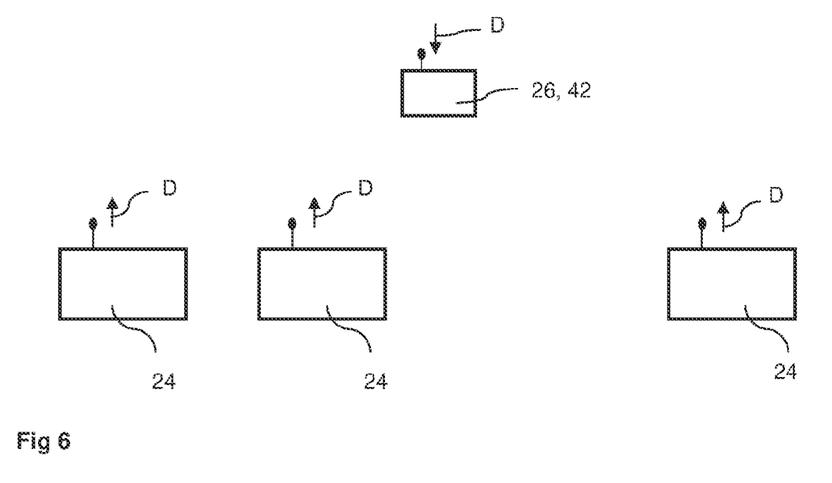

In a preferred embodiment, the evaluation of the data D takes place in a central unit 42, which is provided as a common evaluation unit 26 for a plurality of devices to be monitored, in particular industrial robots 2 to be monitored or respectively hose packages 18 to be monitored. This situation is illustrated in FIG. 6. The individual measuring units 24 of the individual units to be monitored, i.e. the hose packages 18 of the industrial robots 2, each transmit their data D, for example, first to a cloud, from where they are then retrieved and evaluated via the central unit 42. This measure provides the central unit 42 with a very broad database. On the basis of this broad database, data models can then be created, which represent the load on the hose packages 18 as realistically as possible and thus allow important information to be obtained, for example, for the future development and design of further hose packages 18.

The invention has been described herein using the example of hose package 18 as the flexurally elastic element, but is not limited to use with a hose package 18.

The invention claimed is:

1. A monitoring system for monitoring a bending load of a strand-shaped element that is subjected to bending during operation, comprising:
   the strand-shaped element, which extends in a longitudinal direction;

said strand-shaped element having a sheath and said sheath having a recess formed therein at least in sections on a circumferential side thereof;

a pressure-sensitive sensor element disposed in said recess and configured to emit a sensor signal upon being subjected to a pressure load;

a local measuring unit for receiving the sensor signal; and an evaluation unit for evaluating the sensor signal with regard to a bending stress of said strand-shaped element on a basis of a pressure load of said sensor element caused by a bending of said strand-shaped element;

wherein said recess is an at least sectionally helical groove, said sensor element is a sensor line lying in said groove, and said sensor line has a conductor surrounded by an elastically deformable dielectric and is connected to said local measuring unit.

2. The monitoring system according to claim 1, wherein said local measuring unit is configured to feed a measurement signal into said sensor line and to receive a signal portion of the measurement signal reflected at an interference point, wherein the reflected signal portion forms the sensor signal, and wherein the measurement signal is at least partially reflected at the interference point as a result of a pressure load on the dielectric that is stressed by a bending.

3. The monitoring system according to claim 1, wherein said sheath is a corrugated tube with the helical groove.

4. The monitoring system according to claim 1, wherein at least one supply line is guided in said sheath.

5. The monitoring system according to claim 1, wherein said strand-shaped element is a hose package for a multi-axis industrial robot.

6. The monitoring system according to claim 1, wherein said sensor line has an outer diameter, said groove has a groove width, and the outer diameter is matched to the groove width.

7. The monitoring system according to claim 1, wherein said dielectric is a foamed dielectric.

8. The monitoring system according to claim 1, wherein a material of said dielectric is a material selected from the group consisting of a thermoplastic rubber, a polyurethane (PUR), and a thermoplastic vulcanizate (TPV).

9. The monitoring system according to claim 1, wherein said sensor line is a coaxial line.

10. The monitoring system according to claim 1, wherein said evaluation unit is configured to identify a location of the bending based on the sensor signal.

11. The monitoring system according to claim 1, wherein said evaluation unit is configured to determine a direction of the bending of said sheath based on the sensor signal.

12. The monitoring system according to claim 1, wherein said evaluation unit is configured to conclude a current bending radius based on the sensor signal.

13. The monitoring system according to claim 1, wherein said evaluation unit is a central unit disposed at a distance from the device to be monitored and configured to receive the sensor signal.

14. The monitoring system according to claim 13, wherein a plurality of devices to be monitored are connectable to said central processing unit for data exchange, and said central processing unit is configured to evaluate the data from the plurality of devices to be monitored.

15. A monitoring system for monitoring a bending load of a strand-shaped element that is subjected to bending during operation, comprising:

the strand-shaped element, which extends in a longitudinal direction;

said strand-shaped element having a sheath and said sheath having a recess formed therein at least in sections on a circumferential side thereof;

a pressure-sensitive sensor element disposed in said recess and configured to emit a sensor signal upon being subjected to a pressure load;

a local measuring unit for receiving the sensor signal; and an evaluation unit for evaluating the sensor signal with regard to a bending stress of said strand-shaped element on a basis of a pressure load of said sensor element caused by a bending of said strand-shaped element;

wherein said recess is an at least sectionally helical groove, said sensor element is a sensor line lying in said groove, and said sensor line has a conductor surrounded by a dielectric and is connected to said local measuring unit;

wherein said local measuring unit is configured to feed a measurement signal into said sensor line and to receive a signal portion of the measurement signal reflected at an interference point, wherein the reflected signal portion forms the sensor signal, and wherein the measurement signal is at least partially reflected at the interference point as a result of a pressure load on the dielectric that is stressed by a bending; and wherein said measuring unit is configured to feed in a wobble signal and to perform a frequency reflectometry method.

16. A flexurally elastic strand-shaped element that is subjected to bending during operation and that extends in a longitudinal direction, the element comprising:

a sheath, said sheath having a recess formed therein on a circumferential side at least in sections thereof;

a pressure-sensitive sensor element, said sensor element lying in said recess and being configured to emit a sensor signal upon being subjected to a pressure load; and a local measuring unit for receiving the sensor signal and for transmitting the sensor signal to an evaluation unit;

wherein said recess is an at least sectionally helical groove, said sensor element is a sensor line lying in said groove, and said sensor line has a conductor surrounded by a dielectric and is connected to said local measuring unit; and said sheath is a corrugated tube with the helical groove.

17. The flexurally elastic element according to claim 16, configured as a hose package that is attached to an industrial robot.

* * * * *